US007833672B2

(12) United States Patent
Bronold et al.

(10) Patent No.: US 7,833,672 B2
(45) Date of Patent: Nov. 16, 2010

(54) MODULAR DIRECT FUEL CELL SYSTEM WITH INTEGRATED PROCESSOR

(75) Inventors: Matthias Bronold, Berlin (DE); Diego Larrain, Cologne (DE); Stefan Mergel, Duesseldorf (DE)

(73) Assignees: Samsung SDI Co., Ltd., Yongin-si (KR); Samsung SDI Germany GmbH, Berlin (DE)

( * ) Notice: Subject to any disclaimer, the term of this patent is extended or adjusted under 35 U.S.C. 154(b) by 419 days.

(21) Appl. No.: 11/852,035

(22) Filed: Sep. 7, 2007

(65) Prior Publication Data
US 2008/0063912 A1    Mar. 13, 2008

(30) Foreign Application Priority Data
Sep. 8, 2006  (EP)  .................................. 06120362
Aug. 30, 2007  (KR)  ...................... 10-2007-0087919

(51) Int. Cl.
*H01M 8/04*  (2006.01)

(52) U.S. Cl. ...................... 429/462; 429/512; 429/456; 429/544; 429/452

(58) Field of Classification Search ........................ None
See application file for complete search history.

(56) References Cited

U.S. PATENT DOCUMENTS

| 6,110,613 | A | 8/2000 | Fuller | |
| 6,942,939 | B2 * | 9/2005 | Xie | 429/22 |
| 2004/0062964 | A1 | 4/2004 | Matsuoka et al. | |
| 2004/0166389 | A1 * | 8/2004 | Matsuoka et al. | 429/26 |
| 2005/0058880 | A1 * | 3/2005 | Fujita et al. | 429/38 |
| 2005/0095467 | A1 * | 5/2005 | Tajima et al. | 429/12 |

2006/0081130 A1  4/2006  Muller et al.

FOREIGN PATENT DOCUMENTS

EP    1 383 191 A1    1/2004

(Continued)

OTHER PUBLICATIONS

Korean Office Action dated Jul. 23, 2009, for Priority Korean Application 10-2007-0087919, noting listed reference in this IDS.

(Continued)

*Primary Examiner*—Patrick Ryan
*Assistant Examiner*—Cynthia Lee
(74) *Attorney, Agent, or Firm*—Christie, Parker & Hale, LLP

(57) ABSTRACT

A modular direct methanol fuel cell system includes a housing having a pump for supplying fuel from a fuel tank to a fuel cell stack and a system controller for electronically controlling the modular direct methanol fuel cell system. An integrated processor is contained in the housing, the integrated processor integrating a water condenser and a gas/liquid stream separator. A first fluid connection unit is between the fuel cell stack and the integrated processor for feeding air and fuel exiting from the fuel cell stack to the integrated processor. A second fluid connection unit is between the fuel cell stack and the integrated processor for feeding a fuel mixture from the integrated processor to the fuel cell stack. The direct methanol fuel cell system also includes a third fluid connection unit for feeding pure fuel from the fuel tank to the integrated processor.

29 Claims, 6 Drawing Sheets

FOREIGN PATENT DOCUMENTS

| | | |
|---|---|---|
| EP | 1 429 407 A1 | 6/2004 |
| EP | 1 521 324 A2 | 4/2005 |
| JP | 2005-108717 | 4/2005 |
| WO | WO 99/60644 | 11/1999 |
| WO | WO 2005/122304 A2 | 12/2005 |

OTHER PUBLICATIONS

European search report dated Mar. 16, 2007 for corresponding European Patent Application No. 06120362.6.

* cited by examiner

MODULAR DIRECT FUEL CELL SYSTEM WITH INTEGRATED PROCESSOR

CROSS-REFERENCE TO RELATED PATENT APPLICATION

This application claims priority to and the benefit of European Patent Application No. 06 120 362.6, filed on 8 Sep. 2006, in the European Intellectual Property Office, and Korean Patent Application No. 10-2007-0087919, filed on 30 Aug. 2007, in the Korean Intellectual Property Office, the entire contents of which are incorporated herein by reference.

BACKGROUND OF THE INVENTION

1. Field of the Invention

The present invention relates to a modular direct fuel cell system having an integrated processor.

2. Description of the Related Art

A fuel cell generates electricity through an electrochemical reaction between hydrogen and oxygen supplied by external fuel. Typical reactants used in a fuel cell are hydrogen on an anode side and oxygen on a cathode side. Because the only by-product of a fuel cell is water vapor, such fuel cells are desirable for their high efficiency and essentially emission-free use.

Fuel cells are generally classified according to the types of electrolytes they use. Some fuel cell are useful for a stationary power generation facility, and other fuel cells are useful for small mobile devices or for powering cars.

A direct methanol fuel cell (DMFC) relies on the oxidation of methanol on a catalyst layer to form carbon dioxide. Water is consumed on an anode and is produced on a cathode of the DMFC. Protons $H^+$ are transported across a proton exchange membrane to the cathode where the protons react with oxygen to produce water. Electrons are transported via an external circuit from the anode to the cathode that supplies power to an external apparatus. DMFCs do not use a reformer to extract hydrogen from a fuel, which allows the DMFCs to have a compact design, e.g. for use in a mobile telephone.

More specifically, a DMFC includes an anode, a cathode, and an electrolyte membrane between the anode and the cathode. An aqueous methanol solution is used as fuel. A fuel supply source is connected to the DMFC to supply fuel to the anode and an air supply source supplies air to the cathode. A heat exchanger is connected to a cathode exhaust stream to cool the exhaust stream, condense water from the exhaust stream, and discharge the condensed water to be mixed with the fuel. The condensed water is re-circulated to the fuel supply source to be re-used. It is not necessary to premix the fuel with water, thereby allowing the size of the DMFC to be reduced.

A function of a DMFC system is the separation of $CO_2$ from a stream including a mixture of methanol, water, and $CO_2$ discharged from a fuel outlet of a stack. In order for the DMFC to function properly, $CO_2$ must be separated from the stream prior to re-circulating the stream back to the stack. A DMFC system of this kind has been disclosed in U.S. Pat. No. 6,110,613 and U.S. Patent Publication No. 20040062964. The latter discloses condensing water in a heat exchanger of a DMFC system to separate the water from an exhaust stream of the DMFC system, re-circulating the water, and mixing the water with a fuel.

A $CO_2$/fuel separator is installed downstream of a fuel outlet of a stack. An anode cycle for fuel mixture, which includes the $CO_2$/fuel separator, removes $CO_2$ from a reaction stream and exhausts $CO_2$ to the atmosphere through an exhaust outlet. In a fuel mixer, the fuel mixture stream, from which $CO_2$ is removed, is mixed with concentrated fuel received from a fuel tank. A fuel pump feeds the fuel mixture back to the fuel inlet of the stack.

Generally, a DMFC system has many fluid connections between different components, and these fluid connections cause difficulty in manufacturing the DMFC system. More specifically, the assembly of many fluid connections can cause difficulty in automation due to the complex geometrical shapes of the components. In addition, leakage and mix-up of the fluid connections can lead to degradation in quality of the DMFC system. Further, the conventional DMFC system may have an increased number of fluid connections due to the numerous modular components.

SUMMARY OF THE INVENTION

A modular direct methanol fuel cell (DMFC) system includes a housing having a pump for supplying fuel from a fuel tank to a fuel cell stack and a system controller for electronically controlling the modular direct methanol fuel cell system. An integrated processor is contained in the housing, the integrated processor integrating a water condenser and a gas/liquid stream separator. A first fluid connection unit is between the fuel cell stack and the integrated processor for feeding air and fuel exiting from the fuel cell stack to the integrated processor. A second fluid connection unit is between the fuel cell stack and the integrated processor for feeding a fuel mixture from the integrated processor to the fuel cell stack. The direct methanol fuel cell system also includes a third fluid connection unit for feeding pure fuel from the fuel tank to the integrated processor.

The integrated processor may include connectors connecting the water condenser and the gas/liquid stream separator, and first integrating fluid connection units for providing fluid communication between the water condenser and the gas/liquid stream separator. The system controller is adapted to receive an input signal from at least an integrated processor sensor and/or a fuel cell stack sensor, and is adapted to output an output signal for controlling the modular direct methanol fuel cell system.

The first fluid connection unit may include a first fluid connector separated from a second fluid connector and the third fluid connection unit may include a third fluid connector and a fourth fluid connector inducing fuel from the fuel tank to the integrated processor through a fuel pump.

In one exemplary embodiment, the fuel pump is integrated into the integrated processor and the third fluid connection unit includes a fuel tank fluid connector to fluidly connect the fuel tank to the fuel pump of the integrated processor.

A seal is located between fluid openings connecting the water condenser to the gas/liquid stream separator to allow a cooled air/water mixture to be provided from the water condenser to the gas/liquid stream separator. In one exemplary embodiment, the gas/liquid stream separator has a single compartment.

BRIEF DESCRIPTION OF THE DRAWINGS

A more complete appreciation of the invention and many of the attendant advantages thereof, will be readily apparent as the invention becomes better understood by reference to the following detailed description when considered in conjunction with the accompanying drawings in which like reference symbols indicate the same or similar components, wherein.

DETAILED DESCRIPTION OF THE INVENTION

Figure 1:
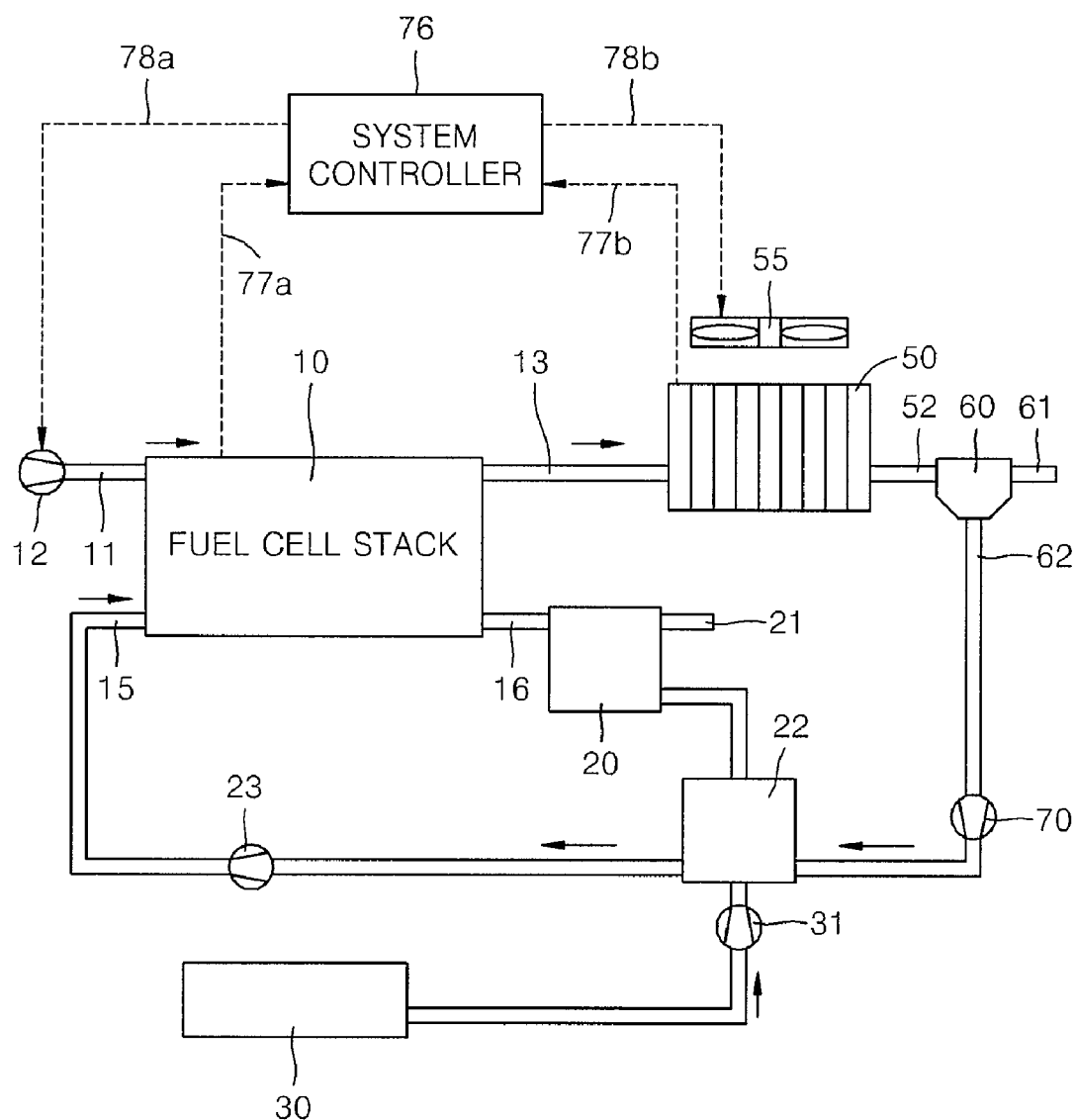
FIG. 1 is a schematic drawing of a conventional modular direct methanol fuel cell system.

With reference now to FIG. 1, a conventional DMFC system comprises a fuel cell stack 10 including an air inlet 11 and an air outlet 13. An air pump or a fan 12 supplies reaction air to a cathode in the fuel cell stack 10 through the air inlet 11. A $CO_2$ separator 20 is installed downstream of a fuel outlet 16 of the fuel cell stack 10. An anode cycle for diluting fuel, which includes the $CO_2$ separator 20, removes $CO_2$ from a reaction stream and discharges $CO_2$ to the atmosphere through a gas outlet 21. In a mixer 22, a fuel stream from a water separator 60 is mixed with pure fuel supplied from a fuel tank 30. A fuel pump 23 feeds the mixed fuel back to a fuel inlet 15 of the fuel cell stack 10.

A heat exchanger 50 is installed downstream of the air outlet 13 of the fuel cell stack 10. A ventilator 55, for example, a fan, is installed to cool the heat exchanger 50, and thus, a stream from the air outlet 13 is cooled and water is condensed. Accordingly, a two-phase stream is outputted from the heat exchanger 50 and the ventilator 55 and the heat exchanger 50 form a heat exchanging assembly. A water separator 60 that separates water from the air stream is installed downstream of the heat exchanger 50. The separated water is returned to the anode cycle of the DMFC system by a pump 70, and the remaining water is discharged to the exterior through a water outlet 61.

A controller 76 for controlling the DMFC system receives input signals $77a$, $77b$ from sensors, for example, a temperature sensor, a level sensor, a concentration sensor, and other sensors. Using the input signals $77a$, $77b$, the controller 76 outputs output signals $78a$, $78b$ for controlling an active components of the system such as the air pump 12, the fan 55, or other components.

As shown in FIG. 1, numerous fluid connections are required between the components of the system, which increases manufacturing costs and occupies a large space in the system. Also, quality problems may be caused due to interchanging the fluid connections during assembly of the system or loosening of the fluid connections during operation of the system.

Figure 2:
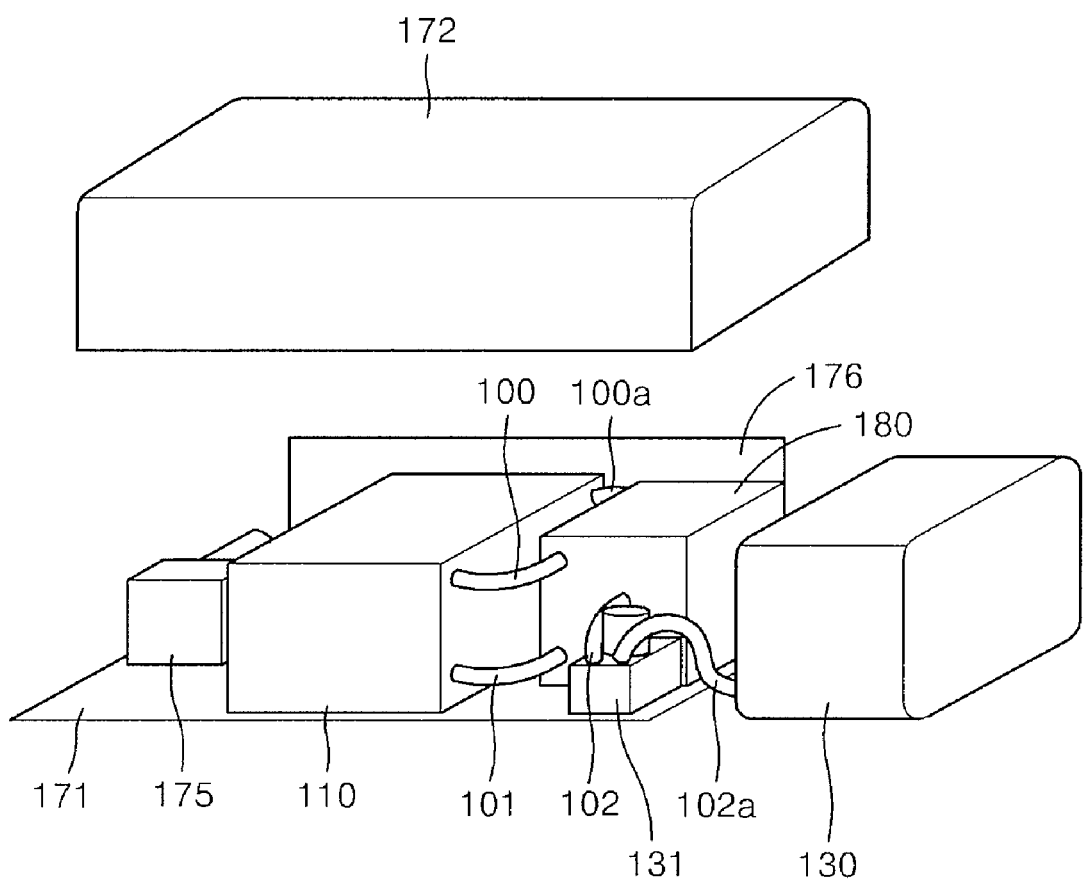
FIG. 2 is a schematic partial perspective view of a modular direct methanol fuel cell system including an integrated processor according to an exemplary embodiment of the present invention.

FIG. 2 is a schematic partial perspective view of a modular direct methanol fuel cell system including an integrated processor according to an exemplary embodiment of the present invention. The modular direct fuel cell system includes a housing having a base 171, a cover 172, a fuel cell stack 110, an air pump 175, a system control unit 176, a fuel tank 130, and an integrated processor 180. The integrated processor 180 integrates condensing water from a stream exhausted through an air outlet of the fuel cell stack 110, separating the condensed water from the air stream, feeding the separated water back to an anode cycle, separating $CO_2$ from the fuel discharged through a fuel outlet of the fuel cell stack 110, and mixing a concentrated fuel from the fuel tank 130 into an anode cycle. Thus, the modular DMFC system requires fewer fluid connections than a conventional DMFC system because a number of the fluid connections are integrated within subunits in the integrated processor 180. The modular direct fuel cell system includes two connections 100, $100a$ through which the air and fuel leaving the fuel cell stack 110 flow to the integrated processor 180 and a fluid connection 101 through which a fuel mixture flows from the integrated processor 80 to the fuel cell stack 110. In addition, the modular DMFC system includes fluid connections 102 and $102a$ through which the concentrated fuel flows from the fuel tank 130 to the integrated processor 180 through a fuel pump 131. Due to the reduced number of fluid connections described above, the system assembly is simplified, saves manufacturing costs, and reduces the likelihood of quality problems related to failed fluid connections.

Figure 3:
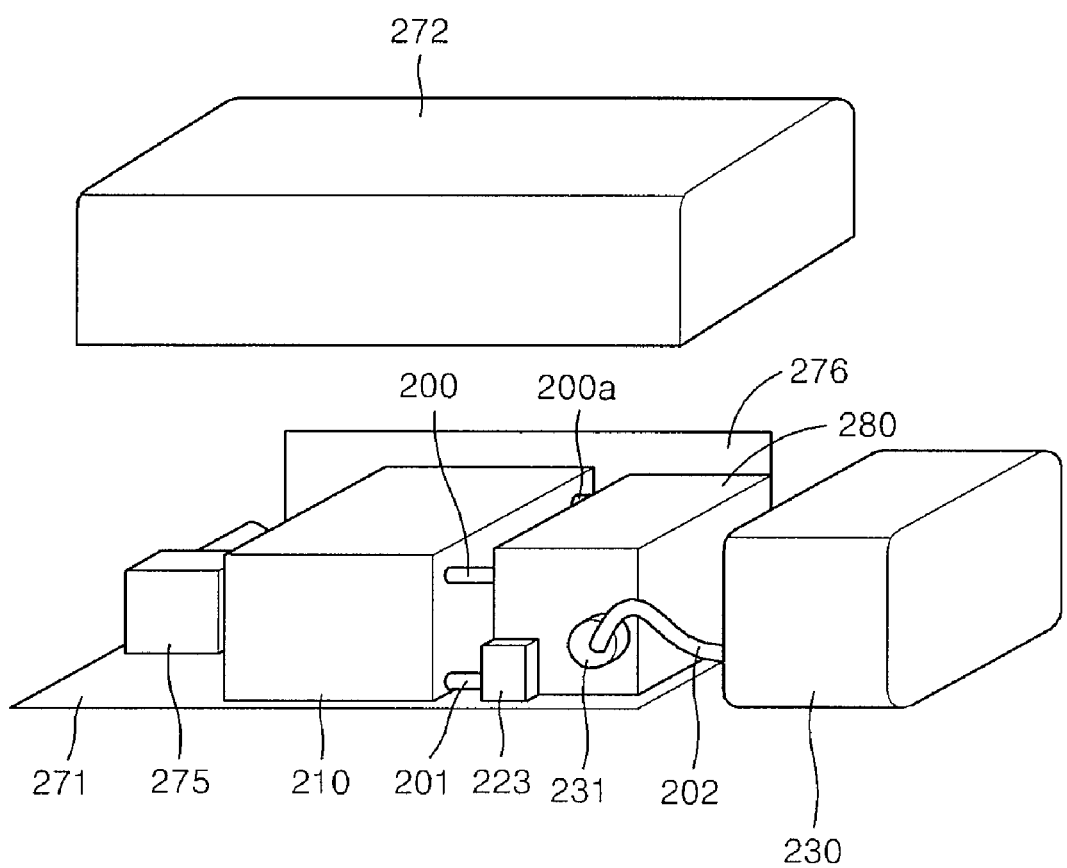
FIG. 3 is a schematic partial perspective view of a modular direct methanol fuel cell system including an integrated processor according to another exemplary embodiment of the present invention.

FIG. 3 is a schematic partial perspective view of a modular direct methanol fuel cell system disclosing an integrated processor according to another exemplary embodiment of the present invention. The integrated processor 280 integrates a fuel pump 231 and a circulating pump 223. Accordingly, the number of fluid connections in the modular DMFC system can further be reduced such that there are two connections 200, $200a$ from the fuel cell stack 210 to the integrated processor 280, one fluid connection 201 from the integrated processor 280 to the fuel cell stack 210, and one fluid connection 202 from the fuel tank 130 to the integrated processor 180.

Figure 4:
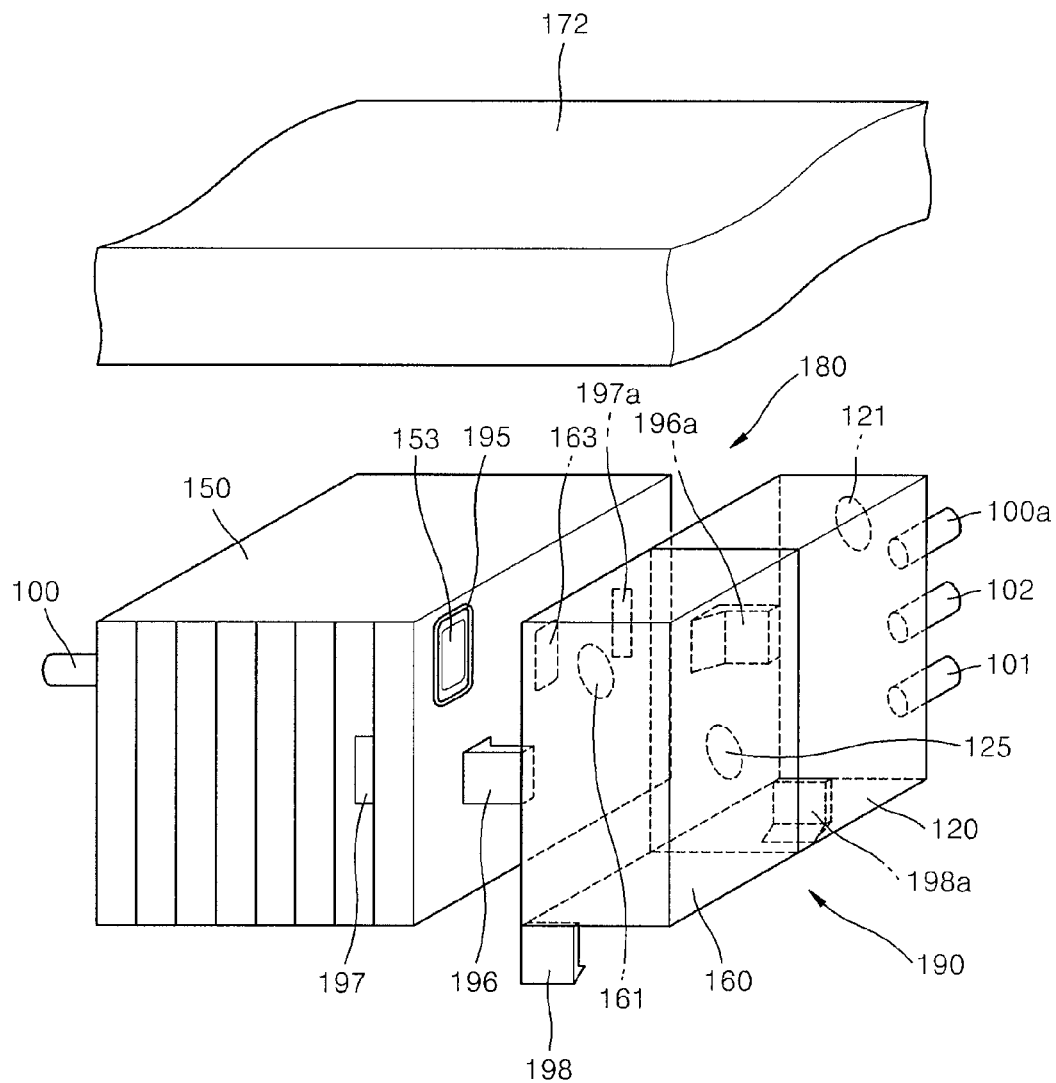
FIG. 4 is a schematic exploded perspective view of the integrated processor of FIG. 2.

FIG. 4 is a schematic exploded perspective view of the integrated processor 180 of FIG. 2. The integrated processor 180 is installed below the cover 172 of a housing and includes a condenser or a heat exchanger 150 and a gas/liquid separator 190. The gas/liquid separator 190 includes at least a $CO_2$/fuel separation compartment 120 and an air/water separation compartment 160 which are partially separated by a diaphragm, but in fluid connection, for example, through an opening 125 in the diaphragm. In the present embodiment, the $CO_2$/fuel separation compartment 120 also functions as a mixer.

An air/water mixture from the air outlet of the fuel cell stack 110 enters the heat exchanger 150 through the air connection 100. The air/water mixture is cooled to condense water contained in the air/water mixture into liquid water. The cooled air/water mixture enters the air/water separation compartment 160 through a fluid connection which is formed by openings 153, 163. In the air/water separation compartment 60, the liquid water is separated from the air and the air is exhausted to the atmosphere through the outlet 161.

With reference also to FIG. 2, a $CO_2$/fuel mixture discharged from the fuel outlet of the fuel cell stack 110 enters the $CO_2$/fuel separation compartment 120 through the connection $100a$. In the $CO_2$/fuel separation compartment 120, $CO_2$ is separated from the $CO_2$/fuel mixture, and is exhausted to the atmosphere through an outlet 121. Concentrated fuel from the fuel tank 130 is fed to the $CO_2$/fuel separation compartment 120 through the fluid connection 102, and water condensed and separated in the air/water separation compartment 160 is fed to the $CO_2$/fuel separation compartment 120 through the opening 125. A fuel mixture, produced in the above method, re-enters the fuel cell stack 110 through the fluid connection 101.

The heat exchanger 150 has at least one fluid opening 153 on a surface adjacent to the gas/liquid separator 190 that may be a fluid inlet or a fluid outlet. The gas/liquid separator 190 has a fluid opening 163 corresponding to the fluid opening 153. A seal 195, for example, a gasket, a glue line, a soldering material, or any other sufficient sealant may be located between the fluid openings 153, 163.

Connectors 196, 196a on the gas/liquid separator are adapted to fit into slots 197, 197a, respectively, on the heat exchanger 150 to attach the gas/liquid separator to the heat exchanger. The connectors 196, 196a may be, for example, screws, bolts, ratchets, latches or the like.

Due to the configuration of the elements as described above, the heat exchanger 150 and the gas/liquid separator 190 may be connected by the connectors 196, 196a such that their respective fluid openings 153 and 163 are aligned and sealed by the seal 195. Thus, the heat exchanger 150 can be directly connected to the gas/liquid separator 190 without the need for additional tubes or hoses for fluid connections.

According to an exemplary embodiment, the fluid connections between various components of the integrated processor 180 can be sealed by placing a seal between the fluid openings on corresponding surfaces of the components. Also, according to an exemplary embodiment, additional connectors 198, 198a may be used to connect the integrated processor 180 to the base 171 of the housing or to connect the integrated processor 180 to other parts of the fuel cell system.

Figure 5:
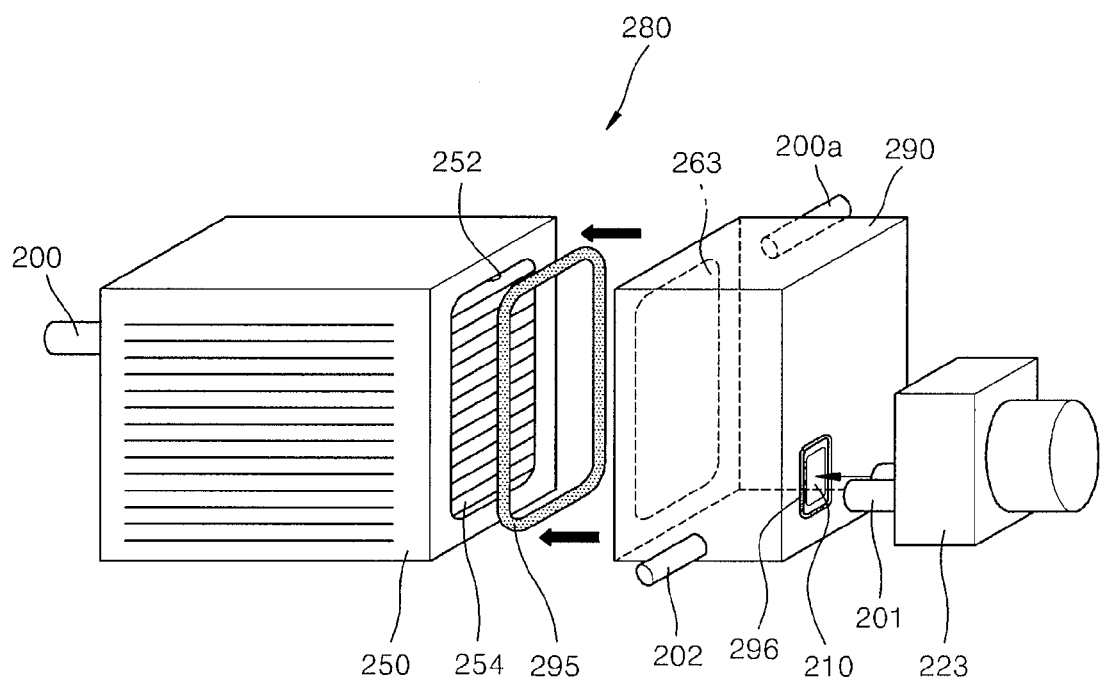
FIG. 5 is a schematic exploded perspective view of the integrated processor of FIG. 3.

FIG. 5 is a schematic exploded perspective view of the integrated processor of FIG. 3. In one exemplary embodiment, a heat exchanger outlet 252 is proximal to various heat exchange elements 254 such as heat exchange plates, tubes, or the like. The heat exchanger outlet 252 may be directly connected to the fluid opening 263 of a gas/liquid separator 290. A seal 295 may be located between the heat exchanger 250 and the gas/liquid separator 290 during assembly.

In one exemplary embodiment, the gas/liquid separator 290 is assembled as a single compartment, and separation of air from the air/water mixture and $CO_2$ from the $CO_2$/fuel mixture is performed in the single compartment. These processes directly achieve mixing condensed water with a fuel, and reduce the space required for installing a diaphragm and fluid guiding means. Accordingly, pressure drops between the fluid connections between the heat exchange outlet 252 and the air/water separation compartment 260 may be reduced, thus, reducing power consumption for pumping air.

More specifically, at least one pump 223 is directly attached to a fluid connection 210 of the integrated processor 280. The fluid connection 210 is sealed using another seal 296. The pump 223 may be a circulating pump that pumps the fuel mixture from the gas/liquid separator 290 through the fluid connection 210, and supplies the fuel mixture to a fuel inlet of the fuel cell stack 10. A fuel pump 231 which pumps the concentrated fuel from the fuel tank 130 and feeds the concentrated fuel to the fluid connection 210 to mix with the fuel mixture in the gas/liquid separator 290 may also be incorporated.

Figure 6:
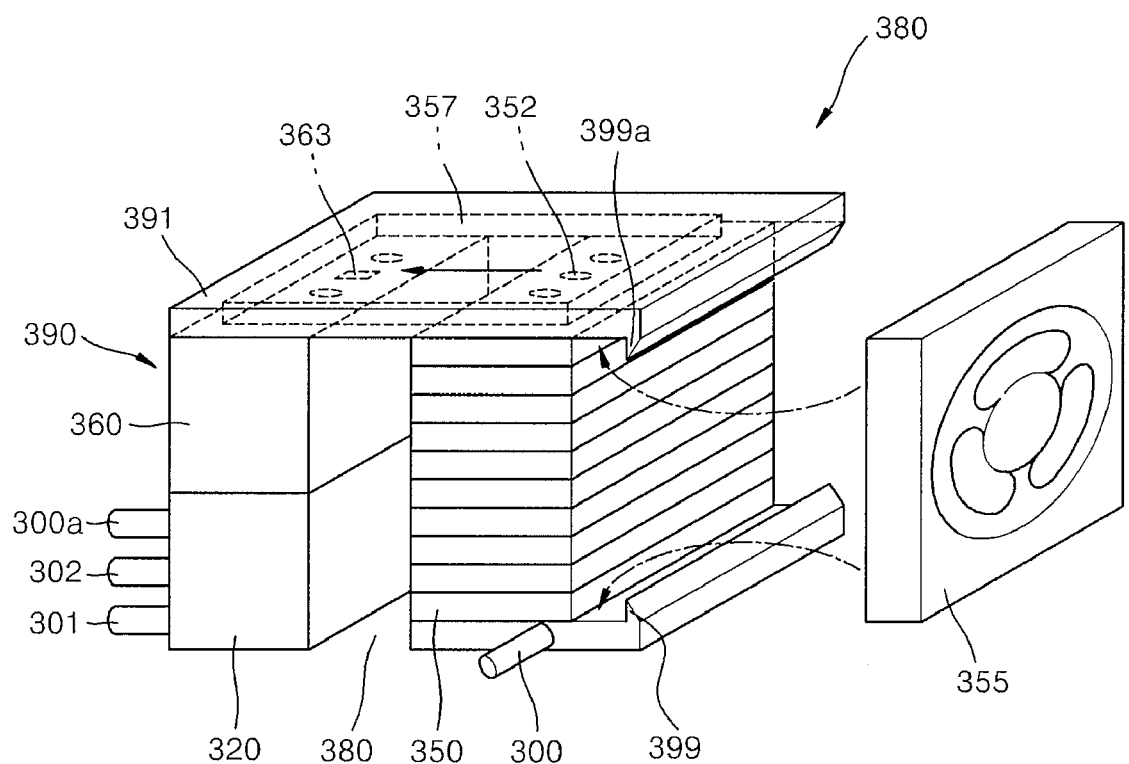
FIG. 6 is a schematic exploded perspective view of an integrated processor according to another exemplary embodiment of the present invention.

FIG. 6 is a schematic exploded perspective view of an integrated processor according to another exemplary embodiment of the present invention. The heat exchanger 350 and the gas/liquid separator 390 are connected through a fluid flow channel 391. The fluid flow channel 391 has two general functions: One function is to guide a condensed flow of water and air discharged from an outlet 352 of the heat exchanger 350 to an inlet 363 of the gas/liquid separator 390 through a fluid connection 357. A second function is to connect the heat exchanger 350 with the gas/liquid separator 390. The fluid connection and the mechanical assembly are achieved by attaching the fluid flow channel 391 to the heat exchanger 350 and the gas/liquid separator 390.

Using the additional fluid flow channel 391, a fan 355 may be attached to the integrated processor 380 of the present embodiment using appropriate connectors 399, 399a. Thus, the assembly of overall fuel cell system is simplified.

According to exemplary embodiments of the present invention, a mechanical assembly and a fluid connection is used to combine a gas/liquid separator and a heat exchanging/condensing apparatus. Additional connectors 198, 198a (FIG. 4) may be formed on a housing of a fuel cell system. Further, system components such as pumps or fans may be attached to the integrated processor 80 to simplify a system structure and fabrication process.

While embodiments of the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A modular direct methanol fuel cell system comprising:
a fuel cell stack;
a housing including a pump for supplying fuel from a fuel tank to the fuel cell stack; a system controller for electronically controlling the modular direct methanol fuel cell system; an integrated processor integrating a water condenser and a gas/liquid stream separator; fasteners connecting the water condenser and the gas/liquid stream separator; and at least one fluid opening providing fluid communication between the water condenser and the gas/liquid stream separator;
a first fluid connector between the fuel cell stack and the integrated processor for feeding air and recycled fuel exiting the fuel cell stack to the integrated processor;
a second fluid connector between the fuel cell stack and the integrated processor for feeding a fuel mixture from the integrated processor to the fuel cell stack; and
a third fluid connector for feeding fresh fuel from the fuel tank to the integrated processor.

2. The modular direct methanol fuel cell system of claim 1, wherein the pump, the fuel cell stack, the integrated processor, and the fuel tank are arranged on a base of the housing.

3. The modular direct methanol fuel cell system of claim 2, wherein the system controller is adapted to receive an input signal from at least an integrated processor sensor and/or a fuel cell stack sensor, and is adapted to produce an output signal for controlling the modular direct methanol fuel cell system.

4. The modular direct methanol fuel cell system of claim 1, wherein the fuel cell stack and the fuel tank are located on opposite sides of the integrated processor.

5. The modular direct methanol fuel cell system of claim 1, wherein the first fluid connector comprises first and second exhaust connectors extending from a fuel outlet and an air outlet of the fuel cell stack.

6. The modular direct methanol fuel cell system of claim 1, wherein the third fluid connector comprises a flow path for producing fuel from the fuel tank to the integrated processor through a fuel pump.

7. The modular direct methanol fuel cell system of claim 6, wherein the fuel pump is integrated into the integrated processor and the third fluid connector comprises a direct connection between the fuel tank and the fuel pump of the integrated processor.

8. The modular direct methanol fuel cell system of claim 1, wherein the first fluid connector provides an air/water mixture from the fuel cell stack to the water condenser.

9. The modular direct methanol fuel cell system of claim 1, wherein a seal is located between fluid openings connecting the water condenser to the gas/liquid stream separator to allow a cooled air/water mixture to be provided from the water condenser to the gas/liquid stream separator.

10. The modular direct methanol fuel cell system of claim 9, wherein the fluid opening of the water condenser is a fluid inlet or a fluid outlet.

11. The modular direct methanol fuel cell system of claim 1, wherein the gas/liquid stream separator comprises a gas/fuel separator and an air/water separator in communication with one another.

12. The modular direct methanol fuel cell system of claim 11, wherein the second fluid connector provides a fuel/gas mixture from the fuel cell stack to the gas/fuel separator.

13. The modular direct methanol fuel cell system of claim 11, wherein the gas/fuel separator comprises a vent through which the gas is exhausted.

14. The modular direct methanol fuel cell system of claim 11, wherein the gas/fuel separator and the air/water separator are partially separated from one another by a diaphragm with a fluid opening adapted to return a portion of the condensed water to the fuel cell stack.

15. The modular direct methanol fuel cell system of claim 1, wherein the water condenser is a heat exchanger.

16. The modular direct methanol fuel cell system of claim 9, wherein the seal is selected from the group consisting of a gasket, a glue line, and a soldering material.

17. The modular direct methanol fuel cell system of claim 1, wherein the fasteners comprise first fasteners on the water condenser and second fasteners on the gas/liquid stream separator or first fasteners on the gas/liquid stream separator and second fasteners on the water condenser, wherein the first fasteners are adapted to fit to the second fasteners.

18. The modular direct methanol fuel cell system of claim 1, wherein the fasteners are threaded screws or bolts, or ratchets or latches having associated indentations.

19. The modular direct methanol fuel cell system of claim 1, wherein a fluid opening of the water condenser is in fluid contact with a heat exchanging element formed in the water condenser.

20. The modular direct methanol fuel cell system of claim 18, wherein the heat exchanging element comprises plates or tubes.

21. The modular direct methanol fuel cell system of claim 1, further comprising at least one pump adapted to pump fuel to the fuel cell stack.

22. The modular direct methanol fuel cell system of claim 21, wherein the at least one pump is a circulation pump for pumping a fuel mixture from the integrated processor to the fuel cell stack.

23. The modular direct methanol fuel cell system of claim 1, wherein the first integrating fluid connector is a fluid guide for connecting the water condenser and the gas/liquid stream separator.

24. The modular direct methanol fuel cell system of claim 23, wherein the fluid guide comprises a condensing stream fluid guide for guiding a water/air condensing stream flowing from the water condenser into the gas/liquid stream separator, and for providing a mechanical connection between the water condenser and the gas/liquid stream separator.

25. The modular direct methanol fuel cell system of claim 1, further comprising a fan attached to the water condenser.

26. The modular direct methanol fuel cell system of claim 23, wherein the fluid guide is located on an upper portion of the water condenser and the gas/liquid stream separator.

27. The modular direct methanol fuel cell system of claim 23, wherein the fluid guide is rectangular.

28. The modular direct methanol fuel cell system of claim 21, wherein the at least one pump is a fuel pump that pumps fresh fuel from the fuel tank to the integrated processor.

29. A modular direct methanol fuel cell system comprising:
a fuel cell stack;
a housing including a pump for supplying fuel from a fuel tank to the fuel cell stack; a system controller for electronically controlling the modular direct methanol fuel cell system; and an integrated processor integrating a water condenser and a gas/liquid stream separator, wherein the gas/liquid stream separator comprises a gas/fuel separator and an air/water separator in communication with each other and wherein the gas/fuel separator and the air/water separator are partially separated from one another by a diaphragm with a fluid opening adapted to return a portion of the condensed water to the fuel cell stack;
a first fluid connection unit between the fuel cell stack and the integrated processor for feeding air and recycled fuel exiting the fuel cell stack to the integrated processor;
a second fluid connector between the fuel cell stack and the integrated processor for feeding a fuel mixture from the integrated processor to the fuel cell stack; and
a third fluid connector for feeding fresh fuel from the fuel tank to the integrated processor.

* * * * *

UNITED STATES PATENT AND TRADEMARK OFFICE
CERTIFICATE OF CORRECTION

| | |
|---|---|
| PATENT NO. | : 7,833,672 B2 |
| APPLICATION NO. | : 11/852035 |
| DATED | : November 16, 2010 |
| INVENTOR(S) | : Matthias Bronold et al. |

It is certified that error appears in the above-identified patent and that said Letters Patent is hereby corrected as shown below:

In the Claims

Column 7, Claim 20, lines 39 and 40    Delete "Claim 18"
Insert -- Claim 19 --

Signed and Sealed this
Eleventh Day of September, 2012

David J. Kappos
*Director of the United States Patent and Trademark Office*